United States Patent [19]

Matsushita et al.

[11] Patent Number: 4,841,190

[45] Date of Patent: Jun. 20, 1989

[54] RESIN-FILLED PERMANENT-MAGNET STEPPING MOTOR

[75] Inventors: Kunitake Matsushita; Hiroshi Sakuma; Takayuki Yamawaki; Takashi Yoshikura; Hiroshi Sano; Yuzuru Suzuki; Michihiro Torii; Tohru Ohnuki, all of Iwata, Japan

[73] Assignee: Minebea Co., Ltd., Nagano, Japan

[21] Appl. No.: 186,820

[22] Filed: Apr. 27, 1988

[30] Foreign Application Priority Data

May 1, 1987 [JP] Japan .................................. 62-108143
Jun. 19, 1987 [JP] Japan .............................. 62-94431[U]

[51] Int. Cl.$^4$ ............................................ H02K 37/16
[52] U.S. Cl. ...................................... 310/257; 310/43; 310/49 R
[58] Field of Search .................... 310/42, 43, 49 R, 71, 310/154, 162, 194, 257, 163, 164, 89

[56] References Cited

U.S. PATENT DOCUMENTS

| | | | |
|---|---|---|---|
| 4,623,809 | 11/1986 | Westley | 310/49 R |
| 4,714,850 | 12/1987 | Akiba et al. | 310/49 R |
| 4,745,319 | 5/1988 | Tomite et al. | 310/154 |

FOREIGN PATENT DOCUMENTS 295461  4/1965  Netherlands ...................... 310/257

Primary Examiner—Patrick R. Salce
Assistant Examiner—D. L. Rebsch
Attorney, Agent, or Firm—Oliff & Berridge

[57] ABSTRACT

A permanent-magnet stepping motor includes a stator which has resinous protrusions at its one end. An end plate disposed on one side of the stator is molded integrally with the stator. A flange plate is fixed to the other side of the stator, using the protrusions. The stator includes four stator yokes and two annular coils that are disposed at given positions. These yokes and coils are coupled together by molding a resin.

6 Claims, 3 Drawing Sheets

RESIN-FILLED PERMANENT-MAGNET STEPPING MOTOR

BACKGROUND OF THE INVENTION

1. Field of the Invention

The present invention relates to a permanent-magnet stepping motor having a permanent-magnet rotor mounted in a stator which is fabricated by mounting annular coils in annular portions surrounded by stator yokes.

2. Description of the Prior Art

A typical permanent-magnet stepping motor comprises two stator units, each of which includes two stator yokes and an annular coil disposed between the yokes. Each stator yoke has magnetic-pole teeth which are regularly spaced from each other and protrude along the axis of the rotor within a cylindrical space formed along the axis of the rotor within a cylindrical space formed around the axis of the rotor. The pole teeth of one stator yoke of each stator unit are arranged in a staggered relation to the pole teeth of the other stator yoke. The two stator units are coupled together at a position where their pole teeth are displaced by an electrical angle of 90°, in order to form the stator. A rotor of a permanent magnet is mounted inside the stator.

Each stator yoke is made from a ferromagnetic material. Generally, each stator yoke is stamped out of a steel sheet, and a number of magnetic-pole teeth are formed integrally with the inner surface of the yoke. The stamping produces a mechanical distortion, deteriorating the magnetic characteristics. For this reason, the stator yoke may be later heat-treated to compensate for the magnetic characteristics. A coil is mounted between the two stator yokes, forming one stator unit. As an example, one of the stator yokes is shaped like a disk, while the other is shaped like a cup. These two yokes are coupled together about an axis, in order that their magnetic-pole teeth are staggered, and that the outer yokes of the two units substantially form a closed magnetic path. An end plate and a flange plate, each having a bearing, are mounted on opposite sides of the stator. The rotor inside the stator is rotatably held by the bearings.

Heretofore, a stator of this kind has been assembled by successively aligning the stator yokes and then welding, caulking, or otherwise fastening them. More specifically, the joint between the stator yokes is provided with protrusions and holes or notches. A circumferential alignment is effected with these protrusions and holes, and then two stator yokes are stacked on each other and coupled together. Subsequently, other stator yokes are stacked on each other and coupled together. Therefore, when the fastening operation such as a welding or caulking is performed, the inner magnetic-pole teeth may be deformed. In addition, whenever a stator yoke is stacked, error accumulates, deteriorating the dimensional accuracy, especially the radial dimension. As a result, the motor characteristics vary from product to product. Further, a multiplicity of components including the stator yokes are successively placed in position and stacked. After each component is stacked, it is required to be rigidly fixed. As such, there are a number of fixed locations. Thus, the assembly cannot be carried out efficiently. Especially, when welding operations are effected, splashing welding debris may remain inside the assembly. In this case, after the motor is assembled, it may rotate incorrectly because of the debris.

SUMMARY OF THE INVENTION

It is an object of the invention to provide a stepping motor which can be assembled efficiently and with high accuracy, varies little in performance among products, and can deliver large torques.

The invention essentially resides in a permanent-magnet stepping motor comprising: a rotor shaft; a stator consisting of two stator units each of which comprises two stator yokes and an annular coil mounted between the stator yokes, each stator yoke having a number of magnetic-pole teeth which protrude parallel to the axis of the rotor shaft inside a cylindrical space formed around the axis of the shaft, the magnetic-pole teeth of one stator yoke of each stator unit being disposed in a staggered relation to the magnetic-pole teeth of the other stator yoke, the two stator units being disposed in a back-to-back relation such that the outer stator yokes substantially form a closed magnetic path; and a rotor of a permanent magnet mounted in the stator.

One feature of the invention lies in the structure of the stator of the stepping motor. In particular, the spaces in the annular portions surrounded by the stator yokes are filled with a resin to couple together the components that are held in position. An end plate located on one side of the stator is molded integrally with the stator. A flange plate positioned on the other side of the stator has a central bearing and retaining holes formed outside the bearing. When the resin is molded, resinous protrusions formed at one end of the stator are fitted into the retaining holes. Then, the front ends of the protrusions are deformed to fix the flange plate to the stator.

In another feature of the invention, the number of magnetic-pole teeth of each stator unit and the shape of each yoke can be changed according to the required motor performances. For example, the inner stator yoke of each stator unit is shaped like a disk, while the outer one is shaped like a cup. It is also possible to shape both stator yokes like a shallow cup. In this case, they are joined together at their intermediate portions.

In a further feature of the invention, each annular coil comprises a bobbin on which magnet wires are wound. The bobbin consists of an annular core and flanges formed on opposite sides of the core. Preferably, the flanges have notches which act as passages for resin. It is desired that a plurality of pins be burried in the flanges and that ends of the magnet wires be connected with the pins as by soldering.

In still another feature of the invention, the end plate is preferably provided with a mount portion in which a bearing for supporting the rotor is mounted. The bearing can be mounted in the mount portion either when the rotor is mounted in the stator or when the resin is molded. Where the rotor is cantilevered, the mount portion for the rotor is not necessary.

In a preferred embodiment of the invention, the flange plate has an aligning annular protrusion whose diameter agrees with the inside diameter of the stator. The protrusion is fitted in the stator to align the centers of the bearings on opposite sides of the stator.

The resin can be molded by any desired method, but injection molding is preferably adopted. The resin is molded after the stator yokes and the annular coils have been assembled. Simultaneously, the end plate is molded, and resinous protrusions are formed on the injection molding. The flange plate is fixed using the protrusions and so assembly is carried out quite efficiently. The stator yokes of the stator are simultaneously assembled, based on the inner surfaces of the yokes. Therefore, during assembly, error does not accumulate. Hence, the accuracy with which the motor is assembled is greatly enhanced.

For these reasons, radial dimensional errors are especially small. The gap between the outer periphery of the rotor and the inner surface of the stator is uniform. As a result, the motor performances differ only a little from product to product. The dimension of the gap can be reduced further, thus improving the motor performances, especially the torque.

In a yet further feature of the invention, the inside of the stator is filled with the resin and, therefore, the thermal resistance between each coil and the adjacent stator yokes decreases, improving the dissipation of heat. This enables the input power supplied to the motor to be increased. For the same volume, the novel motor can deliver a larger output than the prior art stepping motor.

Other objects and features of the invention will appear in the course of the description thereof which follows.

DETAILED DESCRIPTION OF THE INVENTION

Figure 1:
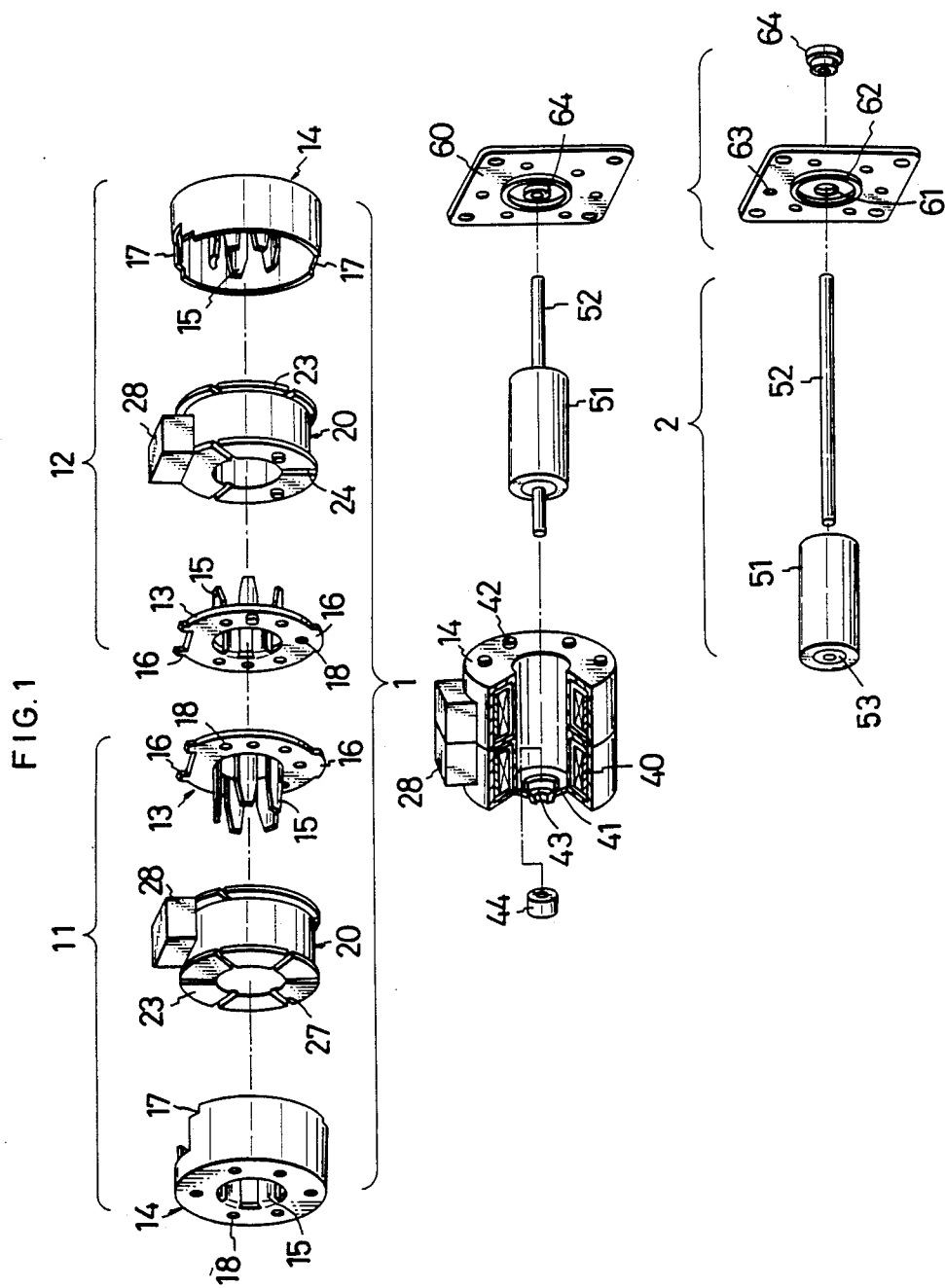
FIG. 1 is a partial cutaway exploded view of a stepping motor according to the invention, for illustrating the manner in which it is assembled.

Referring to FIG. 1, there is shown a stepping motor embodying the concept of the invention. This motor consists of a stator 1 and a rotor 2 in the same manner as the prior art stepping motor. The stator 1 comprises a first stator unit 11 and a second stator unit 12.

Each of the stator units 11 and 12 is composed of an inner stator yoke 13, an annular coil 20, and an outer stator yoke 14. Each of the stator yokes 13 and 14 is made from a ferromagnetic material, and has a number of magnetic-pole teeth 15 protruding parallel to the axis of the rotor 2 within a cylindrical space formed around the axis of the rotor. The teeth 15 are regularly spaced from each other. The inner stator yoke 13 takes the form of a disk, while the outer stator yoke 14 is shaped like a cup. Annular coil 20 is mounted between both stator yokes 13 and 14.

Figure 3:
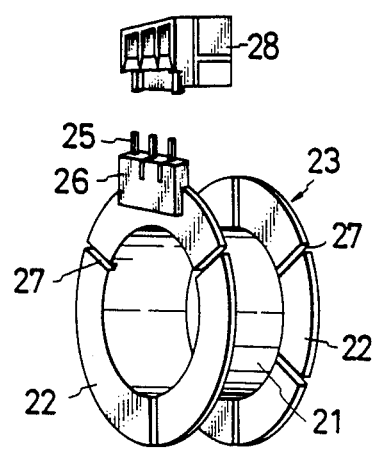
FIG. 3 is a perspective view of a coil bobbin and one example of a connector attached to the bobbin.
Figure 4:
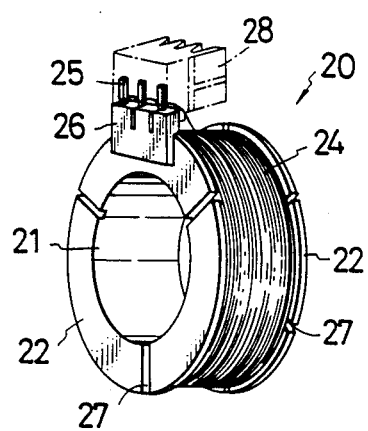
FIG. 4 is a perspective view of an annular coil using the bobbin shown in FIG. 3.
Figure 5:
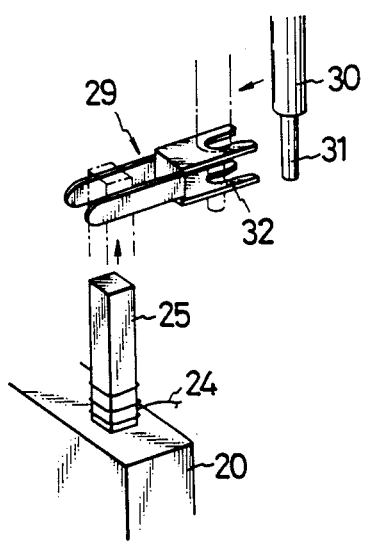
FIG. 5 is a perspective view of a terminal included in a connector and connected with a lead.

The structure of each annular coil 20 is particularly shown in FIGS. 3–5. The coil 20 comprises a bobbin 23 on which magnet wires 24 are wound. The bobbin 23 consists of an annular core 21, together with flanges 22 formed on opposite sides of the core 21. A plurality of, three in this example, pins 25 are mounted in a support 26 on one flange 22 of the bobbin 23 and protrude radially from its outer periphery, for connection of the wires 24. The support 26 has a relatively large thickness to firmly hold the pins 25. Each flange 22 is provided with a plurality of slits or notches 27 extending from the core 21 or from the vicinity of the core 21 to the outer periphery. In this specific example, one flange 22 has three notches 27, while the other flange 22 has six notches 27, all of the notches extending radially. The three notches 27 of said other flange 22 register with three of the six notches 27 in said one flange 22.

The magnet wires 24 are wound on the bobbin 23 built in this way. In this example, two magnet wires 24 together are coiled around the bobbin, since they are used for the stepping motor. Ends of the wires are wound around the bases of the pins 25 and coupled to them by soldering or another method. These operations can be easily performed with an ordinary automatic winder.

In this example, a connector 28 incorporating terminals for connection with leads are mounted to the support 26 to connect the pins 25 with an external circuit. The condition in which the connector 28 has been mounted is indicated by dot-and-dash line in FIG. 4. FIG. 5 particularly shows a terminal 29 included in the connector 28, and in which the terminal 29 is connected with a lead.

Referring particularly to FIG. 5, the terminal 29 for connection with a lead is fabricated by stamping a desired form out of a metal sheet and bending it. One side of the terminal 29 is shaped like the letter "V", and has a width just corresponding to one pin 25. The opposite side is also shaped like the letter "V" but oriented exactly perpendicular to said one side, and is provided with grooves 32 into which the core 31 of a lead 30 can be pressed. When the connector 28 is mounted to the support 26 in this way, the pin 25 is held between the two ends at one side of the terminal 29. Under this condition, a soldering operation is performed to assure electrical and mechanical connection.

Each of the stator yokes 13 and 14 has aligning protrusions 16 and notches 17 used principally for circumferential alignment. Each yoke is formed with holes 18 registering with the notches 27 in the bobbin 23 to pass resin. The inner stator yoke 13 and the outer stator yoke 14 of each stator unit are placed opposite to each other and assembled in such a way that their magnetic-pole teeth 15 are staggered, and that the outer yokes of the two units form a closed magnetic path.

Figure 2:
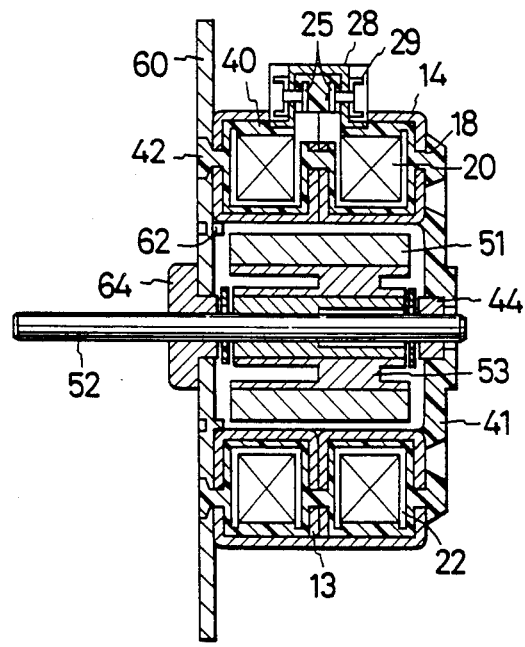
FIG. 2 is a cross-sectional view of the internal structure of the motor shown in FIG. 1.

The stator units 11 and 12 designed as described above are combined together such that the magnetic-pole teeth of the unit 11 are displaced by an electrical angle of 90° from the magnetic-pole teeth of the unit 12. As clearly shown in FIG. 2, a resin 40 is injected into the units 11 and 12 to couple them together. Simultaneously, one end plate 41 is also molded out of the resin integrally with the stator 1. A plurality of retaining, resinous protrusions 42 are formed on the end surface of the outer stator yoke which is on the opposite side of the end plate 41. The resinous end plate 41 is centrally provided with a bearing mount portion 43 in which a bearing 44 is fitted.

In practice, the stator 1 is formed in the manner described now. The four stator yokes and the two annular coils are put together and radially aligned, using a round rod as a jig whose diameter agrees with the inside diameter of the stator yokes, and based on the inner surfaces of the stator yokes. Then, the resin is injected into the spaces of the annular portions surrounded by the stator yokes, especially the spaces formed between each outer stator yoke 14 and the magnetic-pole teeth 15, to couple the yokes and the coils together. Concurrently, the end plate 41 is molded as mentioned previously.

The rotor 2 is mounted inside the stator 1 of the structure described above. The rotor 2 includes a cylindrical permanent magnet 51 through which a rotor shaft 52 extends. The shaft 52 is joined to the magnet 51 with resin or an aluminum ring 53.

Figure 6:
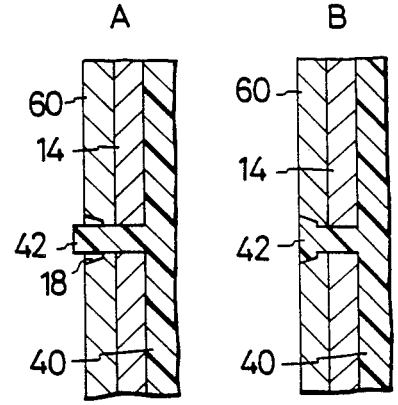
FIGS. 6(A) and 6(B) are cross-sectional views of a flange plate, for showing structures for mounting the plate.

A flange plate 60 is attached to the other end of the stator 1, and is centrally provided with a hole 61 that receives a bearing. An aligning annular protrusion 62 is formed around the hole 61. Retaining holes 63 are formed outside the protrusion 62. The flange plate 60 is stamped out of a metal sheet. A bearing 64 is fitted into the central hole 61 and caulked. The annular protrusion 62 is fitted into the stator 1, and the resinous protrusions 42 are fitted into the holes 63 (see FIG. 6(A)). Under this condition, the front ends of the resinous protrusions 42 are thermally deformed and fixed (see FIGS. 6(A) and 6(B)). Finally, leads for external connection are attached to the connector 28 of the bobbin 23.

The stepping motor constructed as described thus far operates in the same manner as the prior art stepping motor and so the operation is not described herein.

In the above example, the resin is injected into the spaces in the annular portions surrounded by the stator yokes. At this time, the resin enters the spaces through the holes 18 formed in the outer stator yokes 14 Since the notches 27 in the bobbin 23 are located opposite to the holes 18, the resin flows into the stator through the notches 27, filling the spaces. The notches 27 form passages for the resin in the stator, and guide the resin so as to cover the coil of the magnet wires 24 in spite of the presence of the flanges 22. Hence, the injection of the resin can be completed in a short time. Also, the spaces are filled uniformly with the resin. Since the resin 40 is in intimate contact with the wires 24 and with the stator yokes 13 and 14, the heat generated by the wires 24 can be dissipated with an increased efficiency. Further, the resin that covers the wires 24 protects them. Additionally, the inner portion of the connector 28 whose terminals have been connected to the pins is solidified by the resin to fix and protect it.

What is claimed is:

1. A stepping motor comprising:
   two stator units, which comprise a pair of stator yokes, each of said stator yokes having a number of magnetic pole teeth which protrude parallel to an axial direction, and form an annular space between one of said stator yokes and the magnetic pole teeth engaged with each other, and an annular coil comprising a bobbin with magnet wire wrapped therearound disposed in said annular space, said bobbin comprising an annular core having flanges on opposite sides thereof, said two stator units being disposed in a back-to-back relation;
   a rotor consisting of a cylindrical magnet and a rotor shaft inserted in said cylindrical magnet, both ends thereof being extended from both ends of the magnet;
   a plurality of pins mounted radially in said flanges and connected to at least one magnet wire;
   a resin structure filled in the annular spaces and connecting integrally the stator yoke, the annular coil and the pins;
   an end plate formed on a first side of the stator and molded integrally with the stator;
   a plurality of resinous protrusions formed integrally with the resin structure on a second side of the stator yoke;
   a flange plate provided with retaining holes, said protrusions passing through said retaining holes and being deformed to hold said flange plate on said second side of the stator yoke; and
   two bearings mounted co-axially, one on the end plate and the other on the flange plate, said bearings rotatably supporting the rotor shaft.

2. The stepping motor of claim 1, wherein one of the two stator yokes of each stator unit is shaped in the form of a disk, while the other is shaped like a cup.

3. The stepping motor of claim 1 wherein the two stator yokes of each stator unit have aligning protrusions and notches, and wherein the protrusions are fitted in the notches.

4. The stepping motor of claim 1, wherein said flange plate has an aligning annular protrusion whose diameter agrees with an inside diameter of the stator.

5. The stepping motor of claim 1 wherein said flanges have passages for the resin.

6. The stepping motor of claim 1, wherein said end plate has a mount portion in which one of said bearings for supporting the rotor is mounted.

* * * * *